(12) United States Patent
Lee et al.

(10) Patent No.: US 11,196,031 B2
(45) Date of Patent: Dec. 7, 2021

(54) ELECTRODE, METHOD FOR MANUFACTURING THE ELECTRODE, AND ROLLER FOR MANUFACTURING THE ELECTRODE

(71) Applicant: LG Chem, Ltd., Seoul (KR)

(72) Inventors: Sang Kyun Lee, Daejeon (KR); Seok Jin Kim, Daejeon (KR); Cha Hun Ku, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/757,886

(22) PCT Filed: Jul. 3, 2017

(86) PCT No.: PCT/KR2017/007046
§ 371 (c)(1),
(2) Date: Mar. 6, 2018

(87) PCT Pub. No.: WO2018/008926
PCT Pub. Date: Jan. 11, 2018

(65) Prior Publication Data
US 2018/0337392 A1   Nov. 22, 2018

(30) Foreign Application Priority Data

Jul. 4, 2016 (KR) .................. 10-2016-0084360

(51) Int. Cl.
*H01M 4/04* (2006.01)
*H01M 4/13* (2010.01)
*H01M 4/139* (2010.01)

(52) U.S. Cl.
CPC ....... *H01M 4/0435* (2013.01); *H01M 4/0404* (2013.01); *H01M 4/13* (2013.01); *H01M 4/139* (2013.01)

(58) Field of Classification Search
CPC .... H01M 4/0404; H01M 4/0435; H01M 4/13; H01M 4/139
See application file for complete search history.

(56) References Cited

U.S. PATENT DOCUMENTS

2005/0142436 A1* 6/2005 Arai .................. H01M 10/0525
429/94
2005/0287428 A1   12/2005 Cheon et al.
(Continued)

FOREIGN PATENT DOCUMENTS

| EP | 2421075 A2 | 2/2012 |
| JP | 200012002 A | 1/2000 |

(Continued)

OTHER PUBLICATIONS

Machine Translation KR20120035119A (Year: 2012).*

(Continued)

*Primary Examiner* — Victoria H Lynch
(74) *Attorney, Agent, or Firm* — Lerner, David, Littenberg, Krumholz & Mentlik, LLP (57) ABSTRACT

The present invention relates to an electrode, for reducing a difference in ductility between a non-coating portion and a coating portion of the electrode, a method for manufacturing the electrode, and a roller for manufacturing the electrode. Also, the electrode according to the present invention includes an electrode foil, a coating portion coated with an electrode active material on one surface of the electrode foil, and a non-coating portion which is disposed adjacent to the coating portion on the one surface of the electrode foil, and is not coated with the electrode active material and on which a pattern is disposed.

1 Claim, 7 Drawing Sheets

(56) References Cited

U.S. PATENT DOCUMENTS

| | | | |
|---|---|---|---|
| 2012/0045689 A1* | 2/2012 | Okabe | H01M 4/0435 |
| | | | 429/209 |
| 2012/0058387 A1 | 3/2012 | Ahn | |
| 2013/0216879 A1* | 8/2013 | Egawa | H01M 10/0587 |
| | | | 429/94 |
| 2014/0308434 A1 | 10/2014 | Morishima et al. | |

FOREIGN PATENT DOCUMENTS

| | | |
|---|---|---|
| JP | 2012079592 A | 4/2012 |
| JP | 2012238427 A | 12/2012 |
| JP | 2013211145 A | 10/2013 |
| KR | 20060102854 A | 9/2006 |
| KR | 20080037867 A | 5/2008 |
| KR | 20120095122 A | 8/2012 |
| KR | 101199125 B1 | 11/2012 |
| KR | 101255975 B1 | 4/2013 |
| WO | 2013098969 A1 | 7/2013 |

OTHER PUBLICATIONS

Extended European Search Report including Written Opinion for Application No. EP17824482.8 dated Jun. 4, 2018.
Search report from International Application No. PCT/KR2017/007046, dated Sep. 20, 2017.
Human Translation of Paragraphs [0006], [0007], [0021], [0024], [0025], & [0031] for Japanese Patent Application 2000012002; Applicant : Toshiba Battery; published Jan. 14, 2000; 2 pages.

* cited by examiner

ELECTRODE, METHOD FOR MANUFACTURING THE ELECTRODE, AND ROLLER FOR MANUFACTURING THE ELECTRODE

CROSS-REFERENCE TO RELATED APPLICATION

The present application is a national phase entry under 35 U.S.C. § 371 of International Application No. PCT/KR2017/007046, filed on Jul. 3, 2017, published in Korean, which claims priority from Korean Patent Application No. 10-2016-0084360, filed on Jul. 4, 2016, the disclosures of which are hereby incorporated by reference herein.

TECHNICAL FIELD

The present invention relates to an electrode, a method for manufacturing the electrode, and a roller for manufacturing the electrode, and more particularly, to an electrode for reducing a difference in ductility between a non-coating portion and a coating portion of the electrode, a method for manufacturing the electrode, and a roller for manufacturing the electrode.

BACKGROUND ART

Batteries (Cells) that generate electrical energy through physical reaction or chemical reaction of a material to supply power to the outside are used when it is difficult to obtain AC power supplied to the building, or DC power is needed due to the living environments surrounded by various electric and electronic devices.

Among such batteries, a primary battery and a secondary battery, which are chemical batteries using chemical reaction, are being generally used. The primary battery is a consumable battery which is collectively referred to as a dry battery. Also, the secondary battery is a rechargeable battery manufactured by using a material in which a redox process between electric current and the material is repeated many times. When reduction reaction is performed on the material by the current, power is charged. Also, when oxidation reaction is performed on the material, power is discharged. Such the charging-discharging is repeatedly performed to generate electricity.

In a lithium ion battery of the secondary battery, an active material is applied to each of a positive electrode conductive foil and a negative electrode conductive foil at a predetermined thickness, and a separator is interposed between the two conductive foils to wind the two conductive foils and the separator several times in a jelly-roll or cylindrical shape and thereby to manufacture an electrode assembly. Then, the electrode assembly is accommodated in a cylindrical or prismatic can, a pouch, and the like and sealed and processed.

A conventional electrode assembly, a lithium secondary battery using the same, and a method for manufacturing the lithium secondary battery are disclosed in Korean Patent Publication No. 10-2008-0037867.

To manufacture the secondary battery according to the related art, an active material is applied to an electrode sheet, and then, an active material coating portion is rolled.

However, when the electrode sheet is rolled, there is a problem that a phenomenon such as waviness occurs on the electrode after the rolling due to a difference in ductility between a coating portion coated with the active material and a non-coating portion, which is not coated with the active material.

Also, the electrode has a problem that wrinkle or folding occurs due to a difference in tension between the coating portion and the non-coating portion when running for coating or rolling.

When the electrode is notched, electrode breakage or notching failure may occur by the abovementioned phenomena.

DISCLOSURE OF THE INVENTION

Technical Problem

Therefore, the present invention has been made to solve the abovementioned problems, an object of the present invention is to provide an electrode for reducing a difference in ductility between a non-coating portion and a coating portion, a method for manufacturing the electrode, and a roller for manufacturing the electrode.

Technical Solution

An electrode according to an embodiment of the present invention includes an electrode foil, a coating portion coated with an electrode active material on one surface of the electrode foil, and a non-coating portion which is disposed adjacent to the coating portion on the one surface of the electrode foil and is not coated with the electrode active material and on which a pattern is disposed.

and on which a pattern that is not coated with the electrode active material is disposed.

The pattern may have a plurality of concave grooves repeatedly arranged.

The pattern may have a dot shape.

The pattern may have a strip shape.

A method for manufacturing an electrode according to an embodiment of the present invention includes a preparation step of preparing an electrode on which a coating portion coated with an active material and a non-coating portion that is not coated with the active material are formed, a pattern formation step of forming a pattern on the non-coating portion, and a rolling step of rolling the electrode.

In the pattern formation step, the pattern may be formed through punching.

In the pattern formation step, the pattern may be formed by cutting the non-coating portion by using a knife.

In the pattern formation step, the pattern may be formed by partially cutting the non-coating portion.

In the pattern formation step, the pattern may be formed by using a press.

A method for manufacturing an electrode according to another embodiment of the present invention includes a preparation step of preparing an electrode on which a coating portion coated with an active material and a non-coating portion that is not coated with the active material are formed and a rolling step of rolling the electrode so that the coating portion has a flat surface, and a pattern is formed on a surface of the non-coating portion.

In the rolling step, the coating portion and the non-coating portion may be rolled at the same time.

A rolling roller according to an embodiment of the present invention includes a coating surface rolling part having a flat surface and rolling a coating portion of an electrode and a non-coating surface rolling part which is continuous from the coating surface rolling part and on which a pressing part is formed on a surface thereof to roll a non-coating portion of the electrode.

The pressing part may be engraved in or embossed on a surface of the pressing part.

Advantageous Effects

According to the present invention, the difference in ductility between the non-coating portion and the coating portion of the electrode may be reduced.

According to the present invention, the difference in ductility between the non-coating portion and the coating portion of the electrode may be reduced to prevent the waviness from occurring on the electrode when the electrode is rolled.

According to the present invention, when the electrode is rolled, the waviness and the like may be prevented from occurring to prevent the electrode breakage or the notching failure from occurring when the electrode is notched.

According to the present invention, when the electrode having the thin thickness is manufactured, the defects may be reduced.

MODE FOR CARRYING OUT THE INVENTION

Hereinafter, an electrode, a method for manufacturing the electrode, and a roller for manufacturing the electrode will be described in detail with reference to the accompanying drawings.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways. Therefore, the embodiment described in the present specification and the constitutions shown in the drawings are merely the most preferred embodiment of the present invention and do not represent all the technical ideas of the present invention, and thus, it will be understood that various modifications and equivalents may be made to take the place of the embodiment.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 1:
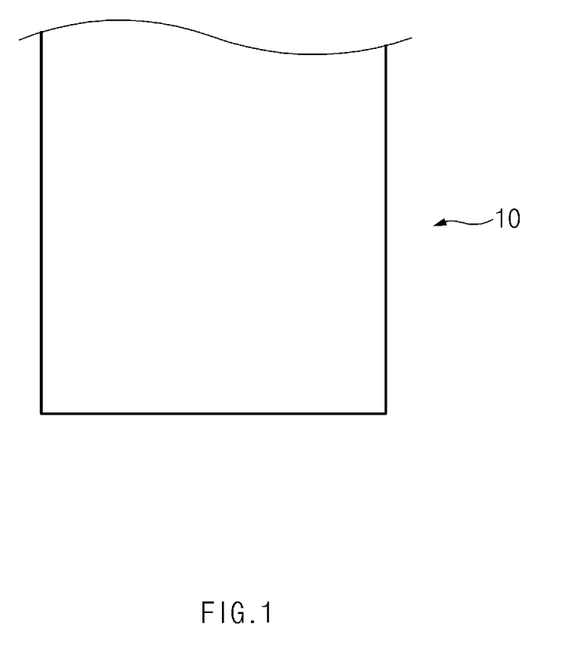
FIG. 1 is a plan view illustrating a portion of an electrode foil according to an embodiment of the present invention.
Figure 2:
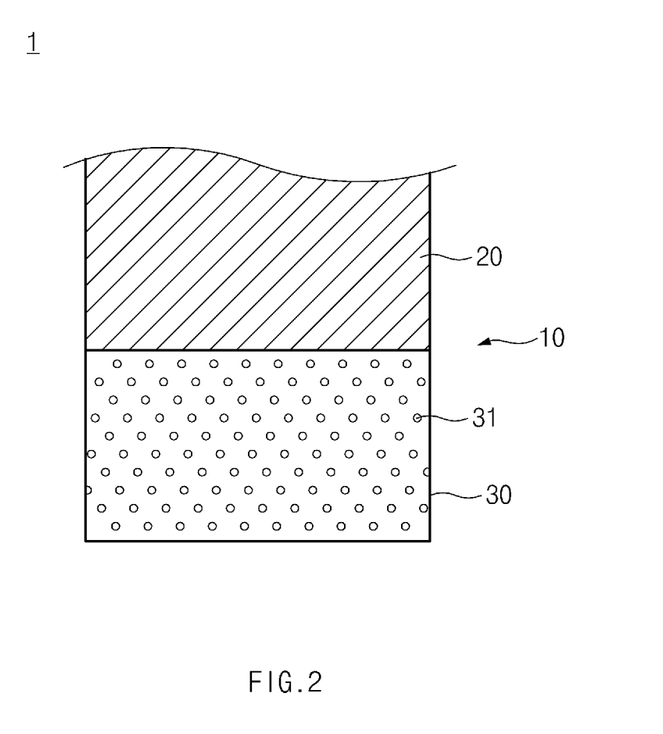
FIG. 2 is a plan view illustrating a process of forming a coating portion and a non-coating portion of FIG. 1 according to an embodiment of the present invention.

FIG. 1 is a plan view illustrating a portion of an electrode foil according to an embodiment of the present invention, and FIG. 2 is a plan view illustrating a process of forming a coating portion and a non-coating portion of FIG. 1 according to an embodiment of the present invention.

Referring to FIGS. 1 and 2, an electrode 1 according to an embodiment of the present invention includes an electrode foil 10, a coating portion 20 coated with an electrode active material on one surface of the electrode foil 10 and a non-coating portion 30 which is disposed adjacent to the coating portion 20 on one surface of the electrode foil 10 and is not coated with the electrode active material and on which a pattern 31 is formed.

The electrode 1 may be one of a positive electrode coated with a positive electrode active material and a negative electrode coated with a negative electrode active material. The positive electrode and the negative electrode with a separator therebetween may be stacked several times to manufacture an electrode assembly.

Also, the electrode assembly may be manufactured by winding the stack, in which the positive electrode, the separator, and the negative electrode are stacked in the form of a jelly-roll.

The positive electrode may be an aluminum plate and include a positive electrode coating portion coated with the positive electrode active material and a positive electrode non-coating portion which is not coated with the positive electrode active material.

The positive electrode active material may be a lithium-containing transition metal oxide or a chalcogenide compound such as $LiCoO_2$, $LiNiO_2$, $LiMnO_2$, and $LiMnO_4$.

For example, the positive electrode coating portion is formed by applying the positive electrode active material to at least one surface of the aluminum plate, and the remaining portion of the aluminum plate, which is not coated with the positive electrode active material, may be the positive electrode non-coating portion.

The negative electrode may be a copper plate and include a negative electrode coating portion coated with the negative electrode active material and a negative electrode non-coating portion, which is not coated with the negative electrode active material.

The negative electrode active material may include a carbon material such as crystalline carbon, amorphous carbon, carbon composite, carbon fiber, a lithium metal, or a lithium alloy.

For example, the negative electrode coating portion may be formed by applying the negative electrode active material to at least one surface of the copper plate, and the remaining portion of the copper plate, which is not coated with the negative electrode active material, may be the negative electrode non-coating portion.

For example, the separator may be manufactured by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

As illustrated in FIG. 2, a pattern 31 is disposed on the non-coating portion 30 of the electrode according to an embodiment of the present invention. The pattern 31 may have a plurality of concave grooves repeatedly arranged, a dot shape, or a stripe shape.

As described above, the pattern 31 of the non-coating portion 30 may be recessed from the non-coating portion 30 to complement a thickness of the non-coating portion 30 having a thickness less than that of the coating portion 20. Thus, when the electrode is rolled, a difference in pressure differently acting on the existing coating portion 20 and non-coating portion 30 may be minimized to minimize a difference in ductility between the coating portion 20 and the non-coating portion 30.

Figure 3:
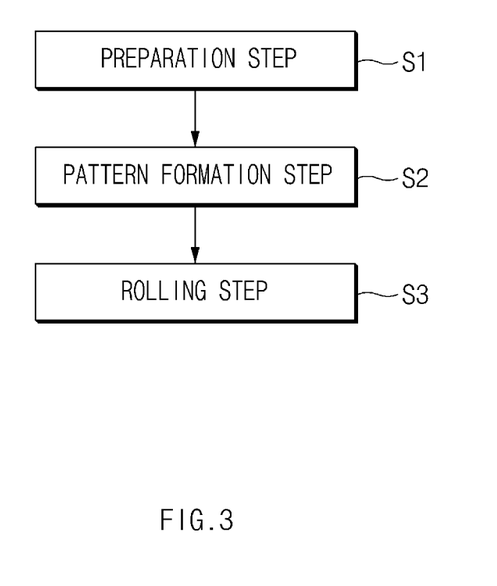
FIG. 3 is a flowchart illustrating a method for manufacturing an electrode according to an embodiment of the present invention.

FIG. 3 is a flowchart illustrating a method for manufacturing the electrode according to an embodiment of the present invention.

As illustrated in FIG. 3, a method for manufacturing the electrode according to an embodiment of the present invention includes a preparation step (S1), a pattern formation step (S2), and a rolling step (S3).

Figure 4:
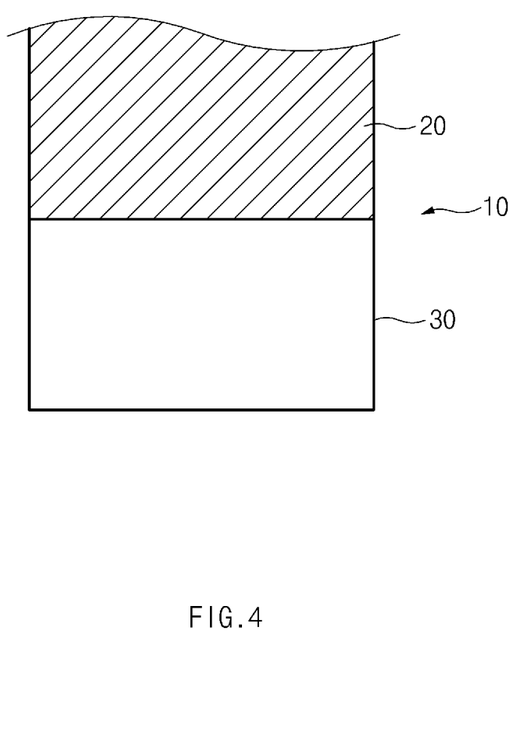
FIG. 4 is a plan view illustrating a state in which the coating portion is formed on the electrode foil of FIG. 1, and a pattern is not formed on the non-coating portion.
Figure 5:
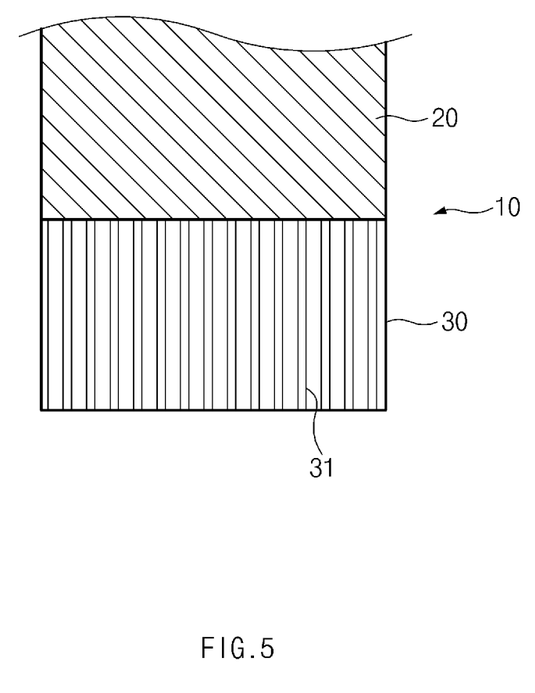
FIG. 5 is a plan view illustrating a state in which a portion of the non-coating portion of the electrode is cut according to an embodiment of the present invention.

FIG. 4 is a plan view illustrating a state in which the coating portion is formed on the electrode foil of FIG. 1, and a pattern is not formed on the non-coating portion, and FIG. 5 is a plan view illustrating a state in which a portion of the non-coating portion of the electrode is cut according to an embodiment of the present invention.

As illustrated in FIGS. 3 and 4, the preparation step (S1) is a step of applying a positive electrode active material or a negative electrode active material to an electrode foil 10 to prepare an electrode having a coating portion 20 coated with an active material and a non-coating portion 30 which is not coated with the active material.

As illustrated in FIG. 2, the pattern formation step (S2) is a step of forming a predetermined pattern 31 on the non-coating portion 30.

The pattern 31 is formed by being rolled by a press.

The pattern 31 may be formed by punching the non-coating portion 30 through punching or partially cutting the non-coating portion 30.

Alternatively, as illustrated in FIG. 5, the pattern 31 may be formed by cutting the non-coating portion 30 by using a knife. Here, the non-coating portion 30 may be partially cut.

The rolling step (S3) is a step of rolling the coating portion 20 coated with the active material and the non-coating portion 30, on which the pattern 31 is formed, at the same time.

In the electrode manufactured through the above-described method for manufacturing the electrode according to an embodiment of the present invention as described above, since the non-coating portion 30 has ductility greater than that of the coating portion 20 due to the pattern 31, a difference in ductility factor may be minimized even though the coating portion 20 and the non-coating portion 30 are rolled at the same time by using one rolling roller.

That is, the non-coating portion 30 may be rolled, or cut, or partially cut to form the pattern 31 so that the non-coating portion 30 has the ductility greater than that of the coating portion 20. Thus, when the non-coating portion and the coating portion 20 are rolled at the same time, the ductility of the non-coating portion 30 may increase by the pattern 31 even though a relatively less pressure is applied to the non-coating portion 30 as compared with that applied to the coating portion 20 and thereby to minimize a difference in ductility of the coating portion 20 and the non-coating portion 30.

Figure 6:
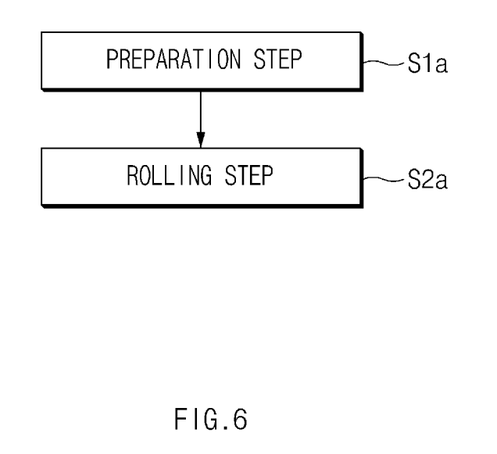
FIG. 6 is a flowchart illustrating a method for manufacturing an electrode according to another embodiment of the present invention.
Figure 7:
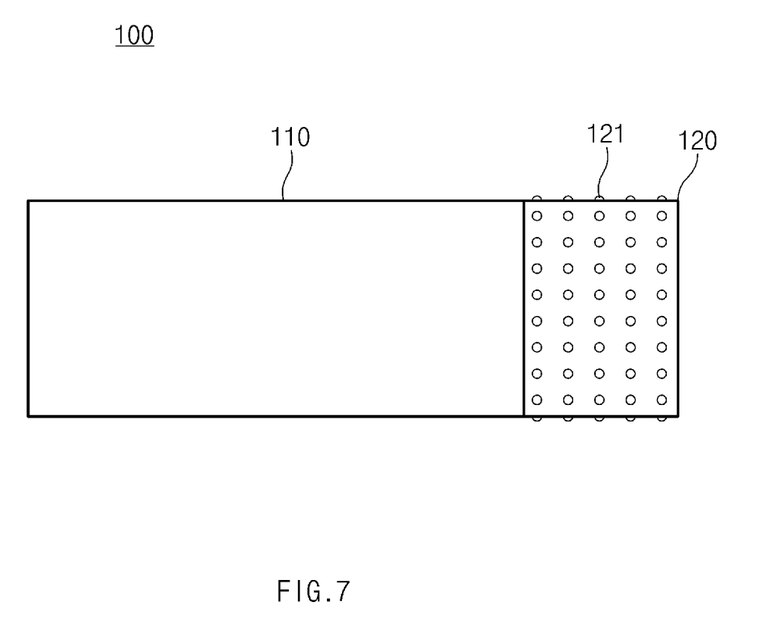
FIG. 7 is a schematic front view of a roller for rolling the electrode according to another embodiment of the present invention.

FIG. 6 is a flowchart illustrating a method for manufacturing an electrode according to another embodiment of the present invention, and FIG. 7 is a schematic front view of a roller for rolling the electrode according to another embodiment of the present invention.

As illustrated in FIG. 6, a method for manufacturing an electrode according to another embodiment of the present invention may include a preparation step (S1a) and a rolling step (S2a).

The preparation step (S1a) is a step of applying a positive electrode active material or a negative electrode active material to an electrode foil 10 to prepare an electrode having a coating portion 20 coated with an active material and a non-coating portion 30 which is not coated with the active material.

The rolling step (S2a) is a step of rolling the coating portion 20 and the non-coating portion at the same time so that a surface of the coating portion 20 is flat, and a pattern is formed on a surface of the non-coating portion 30.

Referring to FIGS. 6 and 7, in the rolling step (S2a), when the coating portion 20 and the non-coating portion 30 are rolled at the same time, a surface corresponding to the coating portion 20 may be flat, and a surface corresponding to the non-coating portion 30 may be compressed by a rolling roller 100 on which a pressing part 121 is formed.

As described above, when the coating portion 20 having a thickness greater by a height of the applied active material than that of the non-coating portion 30 is rolled together with the non-coating portion 30 at the same time, a surface of the rolling roller 100, which rolls the coating portion 20, and a surface of the rolling roller 100, which rolls the non-coating portion 30, may be different from each other to minimize a difference in ductility acting on the coating portion 20 and the non-coating portion 30.

That is, the surface of the rolling roller 100, which rolls the coating portion 20 to correspond to the coating portion 20 may be flat, and the surface of the rolling roller 100, which rolls the non-coating portion 30 to correspond to the non-coating portion 30 may be provided with the protruding pressing part 121 to complement a difference in thickness of the coating portion 20 and the non-coating portion 30, thereby minimizing a difference in ductility acting on the coating portion 20 and the non-coating portion 30.

As illustrated in FIG. 7, the rolling roller 100 according to another embodiment of the present invention includes a coating surface rolling part 110 having a flat surface and rolling the coating portion 20 of the electrode and a non-coating surface rolling part 120 that is continuous from the coating surface rolling part 110 and includes a pressing part 121 on a surface thereof to roll the non-coating portion 30 of the electrode.

The coating surface rolling part 110 may be formed to correspond to the coating portion 20 of the electrode so that the coating portion 20 is rolled to be flat.

The pressing part 121 may be engraved in or embossed on the surface of the non-coating surface rolling part 120 so that the non-coating portion 30 is rolled at the same time when the coating portion 20 is rolled. As a result, a predetermined pattern may be formed on the non-coating portion 30 by the pressing part 121.

That is, since the coating portion 20 has a surface coated with the active material and thus has a thickness greater than that of the non-coating portion 30, when the electrode is rolled by using the general roller, the coating portion 20 and the non-coating portion 30 may have ductility factors different from each other due to a difference in pressure acting on the coating portion 20 and the non-coating portion 30.

Thus, when the pressing part 121 is formed so that the non-coating surface rolling part 120 rolling the non-coating portion 30 protrudes by a predetermined thickness from the coating surface rolling part 110 in the rolling roller 100 to allow the rolling roller 100 to roll the coating portion 20 and the non-coating portion 30 at the same time, the thickness of the non-coating portion 30, which is less than that of the coating portion 20, may be complemented by the pressing part 121 to minimize the difference in ductility of the coating portion 20 and the non-coating portion 30.

As described above, according to the present invention, the difference in ductility between the non-coating portion and the coating portion of the electrode may be reduced.

According to the present invention, the difference in ductility between the non-coating portion and the coating portion of the electrode may be reduced to prevent waviness from occurring on the electrode when the electrode is rolled.

According to the present invention, when the electrode is rolled, the waviness and the like may be prevented from occurring to prevent electrode breakage or notching failure from occurring when the electrode is notched.

According to the present invention, when the electrode having the thin thickness is manufactured, defects may be reduced.

Although the electrode, the method for manufacturing the electrode, and the roller for manufacturing the electrode have been described with reference to the exemplary drawings, various changes and modifications may be made thereto by one skilled in the art without departing from the scope and spirit of the invention as set forth in the appended claims.

The invention claimed is:

1. An electrode comprising:
an electrode foil;
a coating portion coated with an electrode active material on one surface of the electrode foil; and
a non-coating portion which is disposed adjacent to the coating portion on the one surface of the electrode foil and is not coated with the electrode active material and on which a pattern is disposed, the non-coating portion of the electrode foil having a first thickness outside of the pattern, the pattern extending on the one surface of the electrode foil only partially through a thickness of the electrode such that the pattern of the non-coating portion has a second thickness less than the first thickness, the pattern providing the non-coating portion with a first ductility that is greater than a second ductility of the coating portion, the coating portion and the non-coating portion on which the pattern is disposed having structural evidence of being subjected to working by rolling by simultaneous application of a pressure to the entirety of the coating portion and the non-coating portion by a roller rolling over the coating portion and the non-coating portion during formation of the pattern,
wherein the pattern has a plurality of concave grooves repeatedly arranged, the pattern having a strip shape in which the plurality of concave grooves extend perpendicularly from a peripheral edge of the coating portion, the pattern of the non-coating portion having structural evidence of being formed through punching or partially cutting the non-coating portion.

* * * * *